United States Patent [19]

Ravnitzky

[11] Patent Number: 4,776,538
[45] Date of Patent: Oct. 11, 1988

[54] PARACHUTE WITH LEADING-EDGE SLATS

[75] Inventor: Michael J. Ravnitzky, Peekskill, N.Y.

[73] Assignee: Cornell Research Foundation, Inc., New York, N.Y.

[21] Appl. No.: 4,450

[22] Filed: Jan. 20, 1987

Related U.S. Application Data

[63] Continuation of Ser. No. 619,644, Jun. 11, 1984, Pat. No. 4,637,576.

[51] Int. Cl.$^4$ ............................................. B64D 17/14
[52] U.S. Cl. ..................................... 244/145; 244/152
[58] Field of Search ......................... 244/142, 145, 152

[56] References Cited

U.S. PATENT DOCUMENTS

| Re. 26,427 | 7/1968 | Jalbert . |
| 2,096,520 | 10/1931 | Knight . |
| 2,447,187 | 8/1948 | Kunkler . |
| 2,472,601 | 6/1949 | Mallory . |
| 2,759,694 | 8/1956 | Lemoique . |
| 2,929,588 | 3/1960 | Ewing . |
| 3,117,753 | 1/1964 | Ewing . |
| 3,141,640 | 7/1964 | Sutliff et al. . |
| 3,199,814 | 8/1965 | Frider . |
| 3,228,635 | 1/1966 | Hughes et al. . |
| 3,343,769 | 9/1967 | Basmett . |
| 3,356,316 | 12/1967 | Forehand . |
| 3,428,277 | 2/1969 | Everett, Jr. . |
| 3,525,491 | 8/1970 | Barish . |
| 3,559,931 | 2/1971 | Pohl . |
| 3,740,008 | 6/1973 | Grauel . |
| 3,806,071 | 4/1974 | Brown . |
| 3,822,844 | 7/1974 | Sutton . |
| 3,829,045 | 8/1974 | Snyder . |
| 3,866,862 | 2/1978 | Snyder . |

Primary Examiner—Galen Barefoot
Attorney, Agent, or Firm—Jones, Tullar & Cooper

[57] ABSTRACT

A parachute preferably of the ram-air type including a multi-cell canopy structure and at least one slat structure connected to the multi-cell canopy structure to be deployed forward of or above the leading-edge of the multi-cell canopy structure.

14 Claims, 3 Drawing Sheets

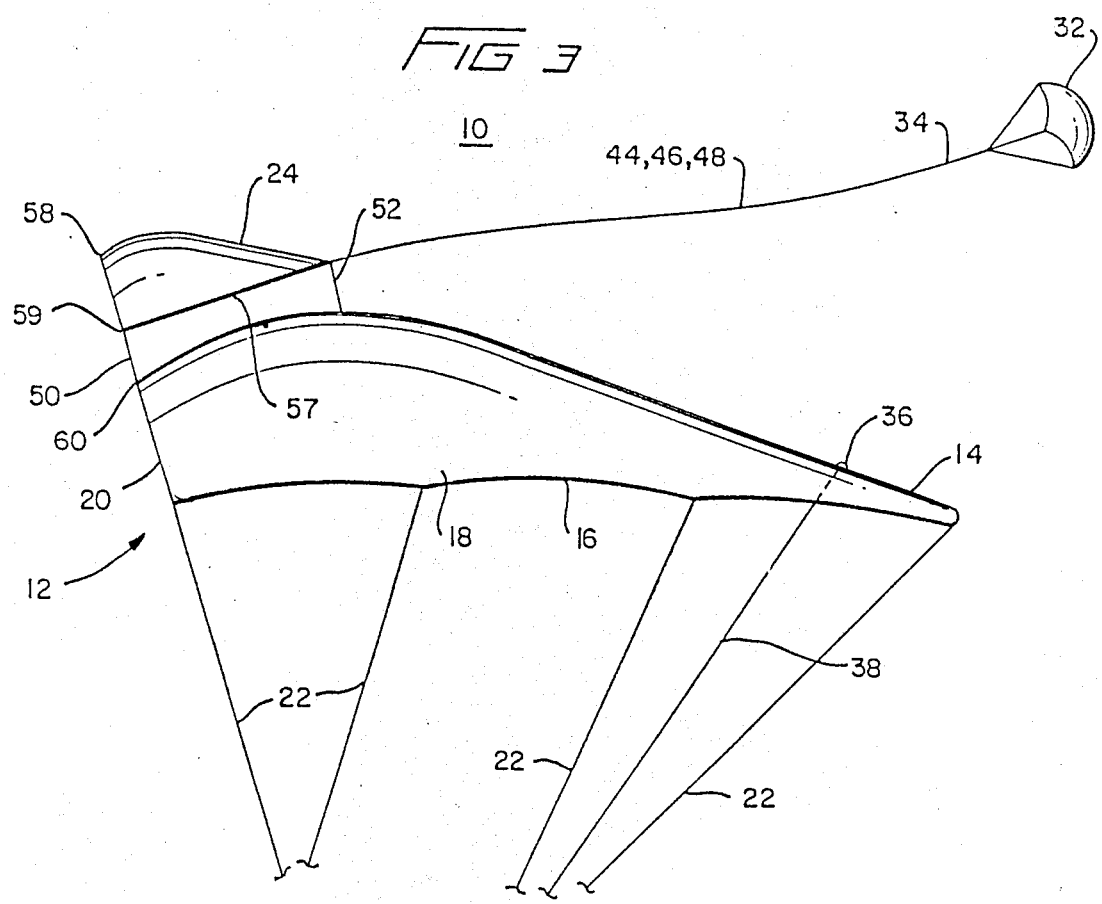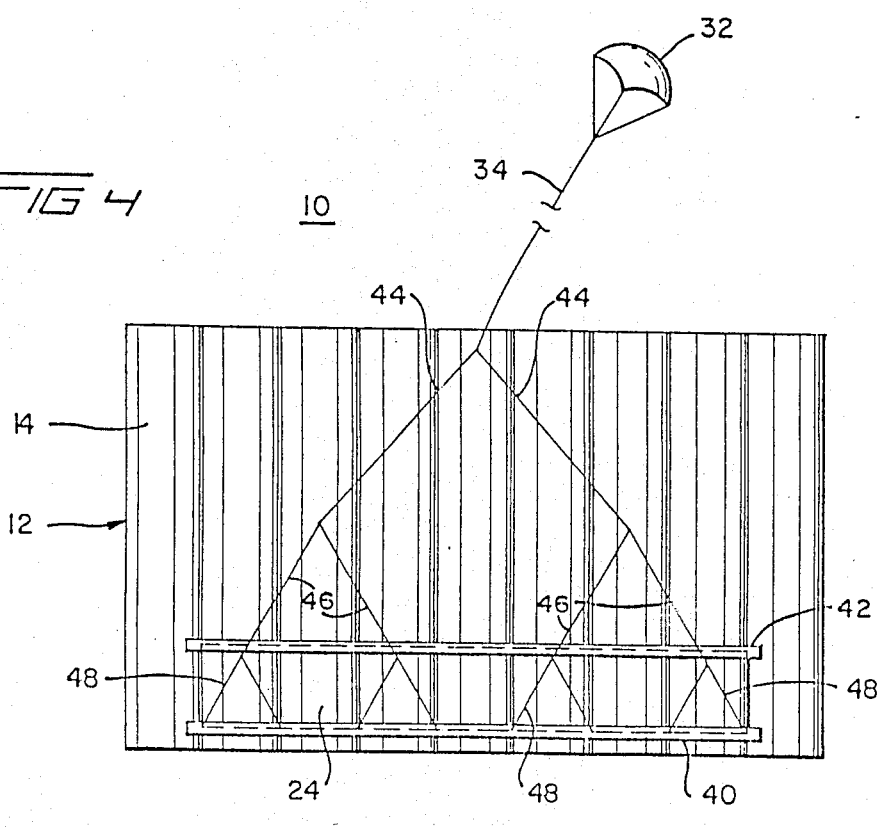

PARACHUTE WITH LEADING-EDGE SLATS

This is a continuation of co-pending application Ser. No. 619,644, filed on June 11, 1984, which is now U.S. Pat. No. 4,637,576.

TECHNICAL FIELD

The present invention relates generally to parachutes of the gliding wing-type, and in particular to a wing-type parachute of a ram-air configuration.

BACKGROUND OF THE INVENTION

The ram-air gliding parachute is known. It consists of a flexible canopy of generally airfoil shape which is inflated and sustained by air flow into cells constructed in the canopy. See, for example, any of the following patents which relate to this type of parachute: 3,285,546; 3,524,613; 3,724,789; 3,972,495; 4,129,272; 4,191,349; 4,389,031 and 4,406,433.

Control of the gliding parachute's forward velocity is a point of concern on landing because of high forward speeds attained by the parachute. An early means of effecting control was to vary the canopy shape through the load lines in general and the front central lines in particular, in order to regulate the forward (and downward components of) glide speed during descent. This type of control, which can be referred to as airfoil distortion control, is not entirely acceptable both because of the necessity to recover from a possible stall condition, and an inherent inefficiency in the method.

Subsequently control has been obtained by bringing the trailing-edge of the canopy downward into a rear flaps configuration by the use of brake lines. As these flaps are pulled downward into effect changing the canopy angle of attack, they raise the lift coefficient of the canopy and thus exchange forward speed for lift. Doing this properly and rapidly ("flaring") converts momentum to lift, thereby reducing descent velocities by a factor of 15 or 20 for landing. This rear-flap "flaring" is quite effective for ram-air parachutes with small aspect-ratios as well as untapered ram-air parachutes, i.e., those with equal chord length along the entire span of the wing. However, for ram-air parachutes of higher aspect-ratios, for example, aspect-ratios of 2.8 and greater, and/or for tapered parachutes, the rear flaps are not sufficient to transfer momentum into lift to slow the canopy down to a desirable horizontal and vertical landing velocity. The use of rear flaps, while adding lift and increasing the maximum lift coefficient, do not sufficiently increase the angle of attack at which stall occurs.

SUMMARY OF THE INVENTION

It would be desirable to have a wing-type parachute, particularly of the ram-air configuration, in which velocity and glide angle control in descent need not encounter the problem of stall due to angle of attack to the extent encountered in the known art, and in which control is as effective for a greater range of aspect-ratios and planform configurations without necessarily a non-optimal angle of attack.

The principle object of the present invention is to provide such control. To achieve this object, the present invention incorporates leading-edge slats on the canopy. Leading-edge slats, by modulating the pressure along the leading-edge of the canopy, increase the angle of attack at which stall occurs. This allows for a greater trade-off of forward speed into left resulting in an improved braking action upon landing.

The front slats can be used in combination with rear slats, if desired, although the present invention contemplates the use of front slats either in front of or above the forward leading-edge of the main canopy.

It is contemplated that the leading-edge slat(s) would be stowed with the canopy and deployed during the decent phase for optimum velocity up to that point or during the inflation phase for optimum lift to drag ratio during the entire flight.

The leading-edge slats can be of a single membrane non-cellular or multi-cellular configuration, or a double membrane non-cellular or multi-cellular configuration, the latter being similar to the ram-air canopy itself. If the slat is multi-cellular, there will be communication between the cells by means of holes or mesh areas extant between the cells. It is noted that aerodynamically, the leading-edge slats of the present invention function similarly to the high-lift mechanisms found on the leading-edges of the rigid wings of fixed wing aircraft.

BRIEF DESCRIPTION OF THE DRAWINGS

Five figures have been selected to illustrate a preferred embodiment of the present invention. While these figures are schematic in nature, they are nevertheless sufficiently detailed to enable the person skilled in the art to practice the invention. Included are:

FIG. 3, which is a schematic view in side elevation of a ram-air parachute representing a variant of the parachute of FIGS. 1–2, including a pilot chute;

FIG. 4, which is a schematic top view of the parachute of FIG. 3; and

DETAILED DESCRIPTION

Figure 1:
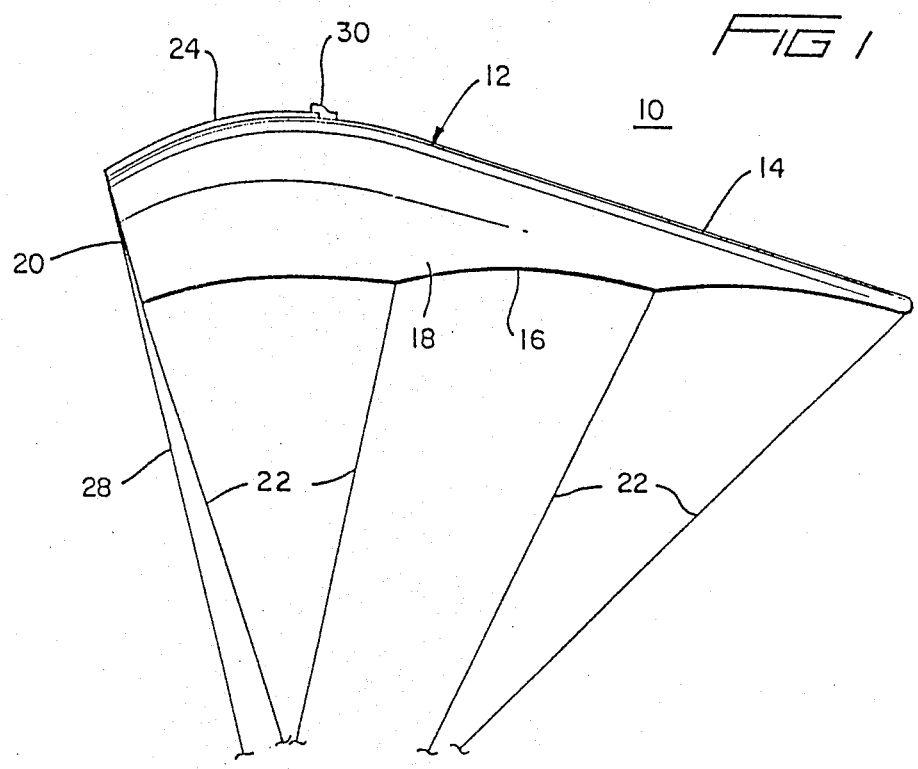
FIG. 1, which is a schematic view in side elevation of a ram-air parachute with the leading-edge slats stowed.

The parachute 10 shown in FIGS. 1–5 comprises a ram-air type parachute including a canopy 12, of somewhat rectangular shape, having a plurality of cells formed by an upper canopy wall 14, a lower canopy wall 16 and a plurality of preferably equally spaced canopy side walls 18. Each cell defines two openings 20 at the leading-edge of the canopy. When viewed in the chordwise direction, the canopy 12 assumes an airfoil shape when deployed. As such, and as a result of the forward speed of the parachute, the airflow first fills the cells, i.e., pressurizes the cells to lend rigidity to the airfoil, and thereafter flows over the upper and lower canopy walls. The flow over the upper and lower canopy walls generates a lift force distribution chordwise from the leading-edge. As a result, the parachute 10 can be considered a lift-type of device and not merely a drag-type of device, the former being capable of significantly greater velocities and control than the latter.

The canopy 12 is connected to a parachute harness (not shown) by load or suspension lines 22. The canopy 12 is constructed, preferably of a low-porosity fabric such as 1.11 ounce/yd$^2$ calendered nylon for the upper canopy wall 14. The lower slat wall (and/or slat cell walls) in the double-membrane configuration 57 may be constructed in part or in whole from higher porosity and/or mesh material.

Figure 2:
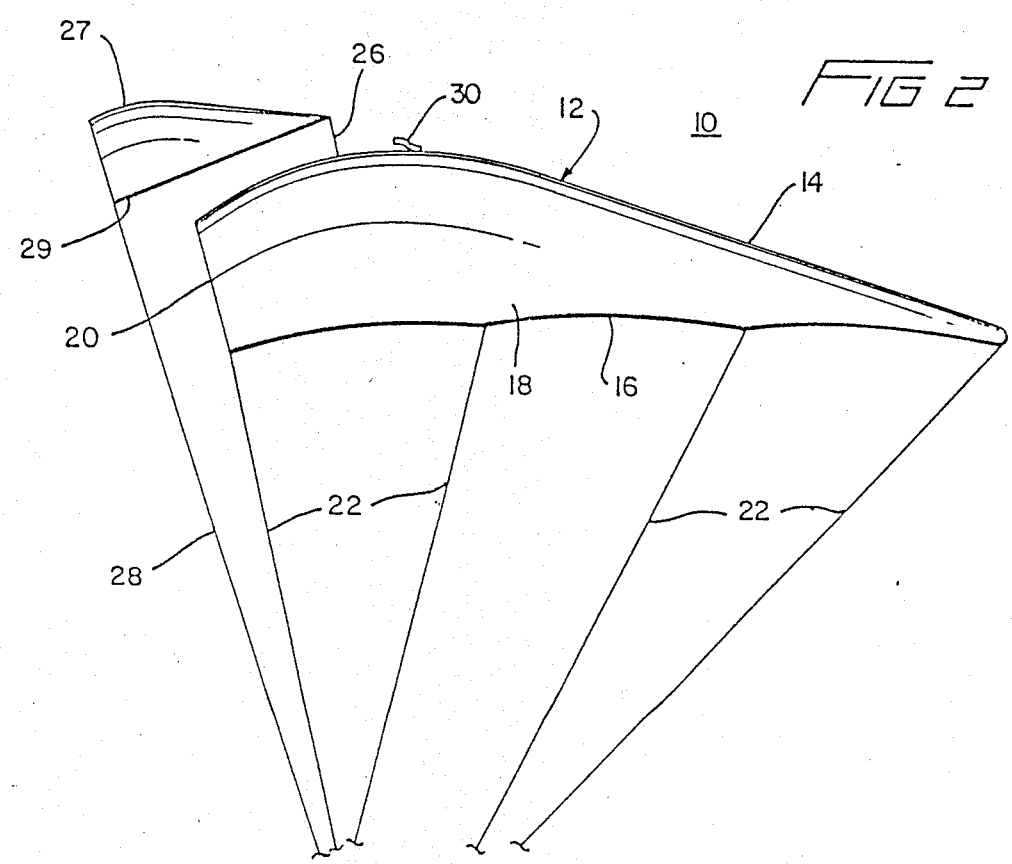
FIG. 2, which is a schematic view in side elevation of of ram-air parachute with the front flaps deployed.

According to one embodiment of the present invention, a leading-edge slat(s) 24 are employed in proximity to the leading-edge of the canopy 12. The slats 24 are attached to the upper canopy wall 14 by a stow line(s) 26 and deployed by control line(s) 28. In the stowed mode, the leading-edge slats 24 are attached to the upper canopy wall 14 by any readily releasable structure 30, such as adhesive tape or rubber bands, or other release mechanism such as daisy-chained suspension line. The releasable structure 30 can directly hold the trailing-edge of the slat 24 to the upper wall 14 of the canopy 12. Preferably, it holds both the leading-edge and trailing-edge. To deploy the leading-edge slats 24, the parachutist simply applies a sufficient force to control lines 28 to break the holding force exerted by the releasable structure 30 and cause the leading-edge slats to move forward to the full extent of the stow lines 26 (FIG. 2).

Figure 5:
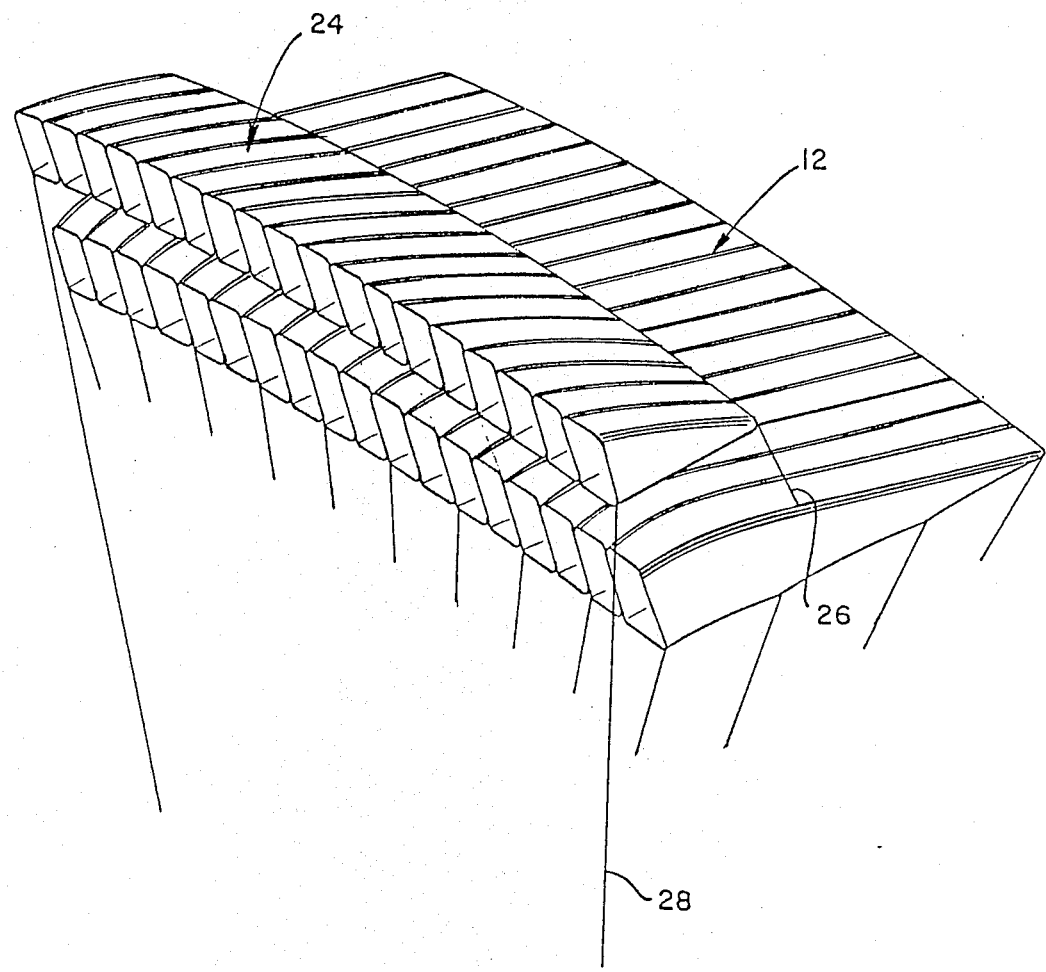
FIG. 5, which is a perspective view of the ram-air parachute of FIG. 2.

The leading-edge slats 24 may each be configured as inflatable single membrane structures, or preferably as inflatable double-menbrane cellular structures. In either case the slats have a top surface and a bottom surface. As shown in FIG. 2, the slat(s) 24 are configured as double-membrane cellular structures having a top surface 27 and a bottom surface 29. When the slat(s) 24 are deployed, as shown in FIG. 2, the control line, or suspension line 28 is connected to the bottom surface 29 at approximately the leading edge thereof, while the stow line 26 is connected to the bottom surface 29 at approximately the trailing edge thereof and to the upper canopy wall 14. Also, one or more slat mechanisms of either configuration can be associated with at least one or more, preferably all of the individual cells of the main canopy (FIG. 5). Where less than all of the cells are associated with a slat area, it is preferred that the slat area(s) be arranged symmetrically with respect to the center of the span of the canopy. In the latter case (FIG. 4), the slat structure 24 comprises a multi-cell structure somewhat like the multi-cell main canopy structure 12. The slat structure may have communication between the slat structure cells by means of holes in the vertical cell walls, or vertical cell wall areas composed of mesh and/or high porosity fabric. In any case, the chord length of the slat structure should be no larger than one-third the chord length of the multi-cell canopy structure 12.

According to the variant illustrated in FIGS. 3 and 4, a pilot chute 32 is included as part of the parachute 10. The primary function of the pilot chute 32 is to deploy the remainder of the parachute 10. The pilot chute 32 is connected to the multi-cell canopy structure 12 by a bridle 34, which in turn is held to the upper canopy wall 14 by, for example, a pin and loop assembly 36. The pin and loop assembly 36 is preferably attached to a line 38 which extends down along the rear suspension lines 22.

As best seen in FIG. 4, the preferred slat structure 24 may extend substantially the full width of the multi-cell canopy structure 12. The slat structure 24 is held flush against the upper canopy wall 14 by leading-edge and trailing-edge elastic stows 40 and 42, respectively. A thin bridle tape 44 is attached to the line 34 at the pin and loop assembly 36. The bridle tape 44 initially lies along the top surface of the upper canopy wall 14 and is held by thin Velcro strips or other means at intervals along the canopy chord. As the bridle tape 44 approaches the trailing-edge of the slat structure 24, it fans out into a multiple attachment/reinforcing bridle 46 which is also held to the top surface of the canopy wall 14 by thin Velcro strips or other means. From the trailing-edge to the leading-edge of the slat structure 24 the bridle tape again fans out into a further multiple attachment into reinforcing bridle 48. In this way an evenly distributed force is applied to the slat structure during its deployment.

For the purpose of deploying the slat structure 22 of FIGS. 3 and 4, the parachutist pulls on the line 38 causing the pilot chute 21, which is already deployed, to break away from the pin and loop assembly 36 because of its drag and pull the bridle tapes 44, 46, and 48, as well as the elastic stows 40 and 42 break away from the top surface of the upper canopy wall 14. As a result, the slat structure 24 inflates the lifts off of the top surface of the upper canopy wall 14 as far as restraint lines 50, 52 permit. Preferably, there are restraint lines associated with each cell 50, 52, one at each of the main parachute cell boundaries, both at the front and rear of the slat structure 24. The relative lengths of the non-slat portion of the front restraint lines 59–60 and rear restraint lines 52 are not critical, but advantages are apparent for cases in which the non-slat portion of the front restraint lines 59–60 are somewhat longer than the rear restraint lines 52. The side walls 18 of the slat structure 24 hold the slat structure in the proper shape against the balancing pull of the pilot chute acting through the various bridle tapes. Temporarily decreasing the angle of attack of the main parachute canopy with front riser control may assist in initially inflating the slat structure. Here again, the slat structure 24 shown in FIGS. 3 and 4 is preferably configured as a flexible multi-cell structure.

While the above discussion relates to a slat mechanism position in front of or above the leading-edge of the canopy structure, it is also possible to employ two slat mechanisms, one which is deployed in front of the leading-edge and the other above the leading-edge of the canopy structure.

A further advantage of the slat mechanism positioned either in front of or above the leading-edge of the canopy structure is that they would assist in preventing collapse of the end cells of the canopy structure.

What is claimed is:
1. A parachute, comprising:
an inflatable canopy structure defining a leading-edge;
a plurality of suspension lines connected at spaced locations to the canopy;
at least one double-membrane slat structure having top and bottom surfaces with a space therebetween, said surfaces defining a leading edge and a trailing edge which with said surfaces direct airflow around the slat structure for producing lift;
means for attaching said at least one slat structure to the canopy structure; and
means for deploying at least one slat structure at least partly and in unison with the canopy structure, so that the leading edge thereof is located forward of and/or above the leading-edge of the canopy structure.

2. The parachute as defined as claim 1, wherein each slat structure is inflatable when deployed.

3. A parachute, comprising:
an inflatable, multi-cell, airfoil shaped canopy structure defining a leading-edge and a trailing-edge;
a plurality of suspension lines connected at spaced locations to the canopy;
at least one double-membrane slat structure having top and bottom surfaces with a sapce therebetween, said surfaces defining a leading edge and a trailing edge which with said surfaces direct airflow around the structure for producing lift;

means for attaching said at least one slat structure to the multi-cell canopy structure; and means for deploying at least one slat structure at least partly and in unison with the canopy structure, so that the leading edge thereof is located forward of and/or above the leading-edge of the multi-cell canopy.

4. The parachute as defined in claim 3, wherein each slat structure is inflatable when deployed.

5. The parachute as defined in claim 3, wherein a plurality of slat structures are provided each associated with one cell of the multi-cell canopy structure.

6. The parachute as defined in claim 5, wherein the slat structures are deployed in unison by said deployment means.

7. The parachute as defined in claim 5, wherein the plurality of slat structures comprise a multi-cell structure, each cell serving as a slat structure.

8. A parachute, comprising:

an inflatable canopy structure defining a leading-edge;

a plurality of suspension lines connected at spaced locations to the canopy;

at least one double-membrane slat structure having top and bottom surfaces with a space therebetween, said surfaces defining a leading edge and a trailing edge which with said surfaces direct airflow around the slat structure for producing lift;

means for attaching said at least one slat structure to the canopy structure; and means for deploying at least one slat structure at least partly and independently of the canopy structure after the canopy structure is deployed, so that the leading edge thereof is located forward of and/or above the leading-edge of the canopy structure.

9. The parachute is defined in claim 8, wherein each slat structure is inflatable when deployed.

10. A parachute, comprising:

an inflatable, multi-cell, airfoil shaped canopy structure defining a leading-edge and a trailing-edge;

a plurality of suspension lines connected at spaced locations to the canopy;

at least one double-membrane slat structure having top and bottom surfaces with a space therebetween, said surfaces defining a leading edge and trailing edge which with said surfaces direct airflow around the slat structure for producing lift;

means for attaching said at least one slat structure to the multi-cell canopy structure; and means for deploying at least one slat structure at least partly independently of the canopy structure after the canopy structure is deployed so that the leading edge thereof is located forward of and/or above the leading-edge of the multi-cell canopy.

11. The parachute as defined in claim 10, wherein each slat structure is inflatable when deployed.

12. The parachute as defined in claim 10, wherein a plurality of slat structures are provided each associated with one cell of the multi-cell canopy structure.

13. The parachute as defined in claim 12, wherein the slat structures are deployed in unison by said deployment means.

14. The parachute as defined in claim 12, wherein the plurality of slat structures comprise a multi-cell structure, each cell serving as a slat structure.

* * * * *